(No Model.)

C. N. WILCOX.
PULLEY FASTENING.

No. 463,960.　　　　　　　　　Patented Nov. 24, 1891.

WITNESSES:　　　　　　　　　INVENTOR:

UNITED STATES PATENT OFFICE.

CURTIS N. WILCOX, OF BROOKLYN, NEW YORK.

PULLEY-FASTENING.

SPECIFICATION forming part of Letters Patent No. 463,960, dated November 24, 1891.

Application filed March 11, 1891. Serial No. 384,673. (No model.)

*To all whom it may concern:*

Be it known that I, CURTIS N. WILCOX, a citizen of the United States, and a resident of Brooklyn, in the county of Kings and State of New York, have invented new and useful Improvements in Pulley-Fastenings, of which the following is a specification.

My invention relates to means of fastening driving-pulleys to high-speed spindles, and has for its object to provide a simple, efficient, and practicable fastening that may be readily detached and reapplied, as is frequently required, particularly in some machines in which, owing to the very high speed, it is preferred to employ belts constructed in endless form rather than such as have ends joined by fastenings, and which machines are so constructed that the pulley has to be detached from the spindle to permit the spindle to be removed from its bearings to apply and remove the belts, all as hereinafter fully described, reference being made to the accompanying drawings, in which—

Figure 1:
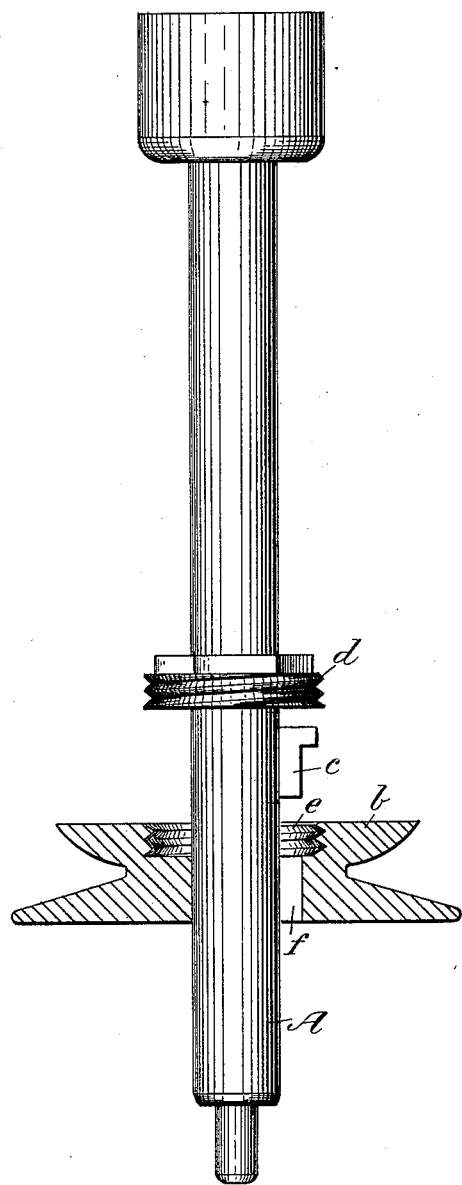
Figure 2:
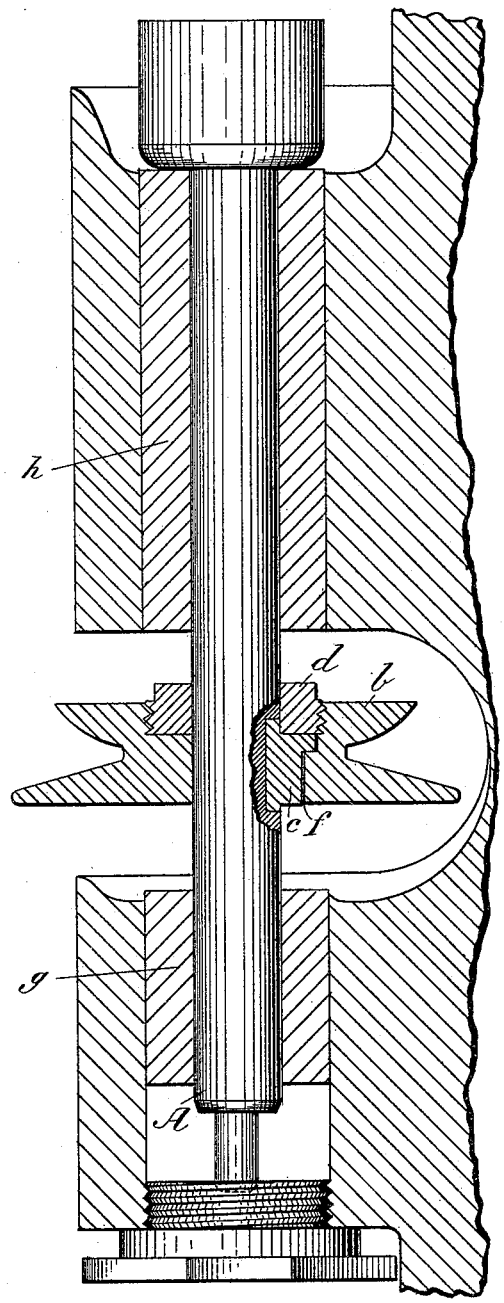

Figure 1 is an elevation of a spindle and the fastening-nut and a section of the pulley to be fastened, the nut and pulley being detached from each other. Fig. 2 is a similar view of the spindle, nut, and pulley, with a part of the spindle in section, the nut and pulley being connected and the pulley fastened. It also represents a section of the spindle-bearings, showing the necessity of detaching the pulley to enable the spindle to be raised for the application of an endless belt.

A represents the spindle; $b$, the pulley; $c$, a feather key, having a radially-projecting head and set in a recess in the spindle at the place where the pulley is to be secured, and $d$ the nut for securing the pulley. The pulley is bored to fit the spindle as close as possible and allow it to be shifted along the spindle without driving, and it has the screw-threaded socket $e$ in one side concentric with the eye and the key-groove $f$ in the eye, said groove being slightly deeper radially than the radial projection of the key, except its head, so that there will be no radial thrust on the pulley by the key. The sides of the key are designed, however, to fit the sides of the key-groove as closely as possible.

The nut $d$ is placed on the spindle next to the end of the key having the head, and is fitted to screw into the socket $e$ when the pulley is adjusted on the key with the bottom of its socket against the head of the key and clamp it fast against said head when the nut draws against the end of the key, whereby the pulley is held against lengthwise movement on the spindle without any radial thrust on the pulley, as when held by a taper key, and so that it is drawn tight by a wrench applied to the nut and is held tight by the friction of the nut in the socket, and is free to be easily shifted off the key and along the spindle when the nut is slacked off, which is done by holding the pulley and spindle with one hand while slackening the nut with a wrench. The nut is likewise fitted as closely to the spindle as will allow it to slide and turn, and therefore favors the true central condition of the pulley, which, being also favored by the absence of any outward radial thrust by the key, runs true and better, besides being more simple and easy to connect and disconnect.

In Fig. 2 I represent an arrangement of spindle-bearings such as is found most practically efficient for very high speed spindles, in which it will be observed that the bearings $g$ $h$ are placed so close together that the spindle cannot be raised out of the lower bearing-socket without disconnecting the pulley and shifting the spindle up in it. It is to be understood that the key is removed from the recess in the spindle to allow the spindle to rise in the upper bearing $h$ to remove the pulley and the spindle also when it is to be taken out.

While it is manifest that my improved pulley-fastening is especially useful in machines having the spindle mounted as shown, its superiority as a pulley-fastening, however the spindle is mounted, is also manifest, and it is not limited to any particular machine or mounting of the spindle.

I claim—

The combination of the spindle, the key having the radially-projecting head, the pulley having the screw-threaded socket in one side and concentric with the spindle, and also having the key-groove, and the nut adjustable on the spindle and adapted to screw into said socket of the pulley, said nut and pulley placed on the spindle on opposite sides of the head of the key, respectively, substantially as described.

In testimony that I claim the foregoing as my invention I have signed my name, in presence of two witnesses, this 5th day of February, 1891.

CURTIS N. WILCOX.

Witnesses:
J. E. FOLK,
M. E. HATCH.